(12) United States Patent
Suzuki et al.

(10) Patent No.: US 7,989,087 B2
(45) Date of Patent: Aug. 2, 2011

(54) BRAZING FIN MATERIAL FOR HEAT EXCHANGERS, HEAT EXCHANGER, AND METHOD OF MANUFACTURING SAME

(75) Inventors: Yuji Suzuki, Tokyo (JP); Yuji Hisatomi, Tokyo (JP); Yoshiharu Hasegawa, Kariya (JP); Taketoshi Toyama, Kariya (JP); Masahiro Shimoya, Kariya (JP)

(73) Assignees: Sumitomo Light Metal Industries, Tokyo (JP); Denso Corporation, Kariya (JP)

( * ) Notice: Subject to any disclaimer, the term of this patent is extended or adjusted under 35 U.S.C. 154(b) by 737 days.

(21) Appl. No.: 11/764,372

(22) Filed: Jun. 18, 2007

(65) Prior Publication Data

US 2008/0003451 A1  Jan. 3, 2008

(30) Foreign Application Priority Data

Jun. 30, 2006  (JP) ................. 2006-180905

(51) Int. Cl.
*B32B 15/20* (2006.01)
*F28F 21/08* (2006.01)
*C22C 21/04* (2006.01)

(52) U.S. Cl. ........ 428/654; 428/925; 165/905; 165/267; 228/183; 228/262.51

(58) Field of Classification Search .................. None
See application file for complete search history.

(56) References Cited

U.S. PATENT DOCUMENTS

| | | | |
|---|---|---|---|
| 3,843,333 A | 10/1974 | Woods | |
| 4,911,351 A | 3/1990 | Ishikawa et al. | |
| 6,849,136 B2 | 2/2005 | Hasegawa et al. | |
| 7,018,722 B2 | 3/2006 | Toyama et al. | |
| 2003/0051342 A1 | 3/2003 | Hasegawa et al. | |
| 2004/0028940 A1 | 2/2004 | Toyama et al. | |
| 2009/0008068 A1 | 1/2009 | Minami et al. | |

FOREIGN PATENT DOCUMENTS

| | | |
|---|---|---|
| DE | 37 87 644 T2 | 4/1994 |
| DE | 102 34 278 A1 | 3/2003 |
| DE | 103 27 755 A1 | 1/2004 |
| JP | 10-17969 | 1/1998 |
| JP | 10-088267 | 4/1998 |
| JP | 2003-39194 | 2/2003 |
| JP | 2003-293061 | 10/2003 |
| JP | 2003-293062 | 10/2003 |
| JP | 2004-84060 | 3/2004 |
| JP | 2005-060790 | 3/2005 |
| JP | 2005-321186 | 11/2005 |
| WO | WO 2005097389 A1 * | 10/2005 |

OTHER PUBLICATIONS

JP Office Action (with English translation), mailed Oct. 26, 2010, in corresponding Japanese Application No. 2006-180905.

* cited by examiner

*Primary Examiner* — Aaron Austin
(74) *Attorney, Agent, or Firm* — Oblon, Spivak, McClelland, Maier & Neustadt, L.L.P.

(57) ABSTRACT

A brazing fin material for heat exchangers includes a core material and a filler metal clad on each side of the core material, wherein the core material is an aluminum alloy including manganese, the filler metal is an aluminum alloy including 6 to 9.5 mass % of silicon, silicon particles in the filler metal have an average circle equivalent diameter of 3 μm or less, and the brazing fin material has a thickness of 0.06 mm or less.

19 Claims, No Drawings

BRAZING FIN MATERIAL FOR HEAT EXCHANGERS, HEAT EXCHANGER, AND METHOD OF MANUFACTURING SAME

CROSS REFERRENCE TO RELATED APPLICATIONS

The present application is based on and claims the benefit of priority under 35 USC §119 to Japanese Patent Application No. 2006-180905 filed Jun. 30, 2006.

BACKGROUND OF THE INVENTION

1. Field of the Invention

The present invention relates to a brazing fin material for heat exchangers made of an aluminum alloy. More particularly, the present invention relates a brazing fin material for heat exchangers made of an aluminum alloy manufactured by joining a fin material and a working fluid passage material by brazing, such as a radiator, a heater core, an oil cooler, an intercooler, and a condenser or an evaporator for a car air conditioner, particularly to a brazing fin material for heat exchangers which rarely produces die wear when forming a fin and exhibits excellent intergranular corrosion resistance and joinability, a heat exchanger including the brazing fin material, and a method of manufacturing the same.

2. Description of Related Art

A heat exchanger made of an aluminum alloy is widely used as an automotive heat exchanger such as a radiator, a heater core, an oil cooler, an intercooler, and an evaporator and a condenser for a car air conditioner. A heat exchanger made of an aluminum alloy is manufactured by combining an aluminum alloy fin material or a brazing fin material in which a filler metal is clad on each side of an aluminum alloy with an extruded flat tube (working fluid passage material) made of an Al—Cu alloy, an Al—Mn alloy, an Al—Mn—Cu alloy, or the like, or with a tube obtained by forming a brazing sheet in which a filler metal is clad on one side of the above alloy in a flat shape, and joining the fin material and the tube through the filler metal by flux brazing using a chloride flux, inert gas atmosphere brazing using a fluoride flux, or vacuum brazing.

The filler metal is disposed on one side of the working fluid passage material or each side of the fin material. As the filler metal, a filler metal made of an aluminum alloy containing silicon is generally used.

When using a brazing fin material for heat exchangers in which a filler metal is clad on a core material, the filler metal clad on the brazing fin material is melted by heating for brazing and flows toward the brazing joint portion to effect brazing. Silicon in the filler metal is diffused into the core material during heating for brazing. Since silicon tends to be diffused into the grain boundaries of the core material rather than into the grains, a region with a low potential is produced near the grain boundaries, whereby intergranular corrosion tends to occur in the core material after brazing.

The strength of the heat exchanger core is decreased by intergranular corrosion of the core material. When the filler metal is diffused only in the surface region of the core material, intergranular corrosion does not reach the center of the core material. Therefore, the strength of the heat exchanger core is ensured when the brazing fin material for heat exchangers has a large thickness.

In recent years, a further improvement in fuel consumption of automobiles has been demanded from the environmental point of view, and a reduction in weight has been increasingly demanded for automotive heat exchangers. Therefore, the constituent members of the heat exchanger such as a fin material and a working fluid passage material (tube material) have been reduced in thickness, and a fin material with a small thickness has been in demand.

If the thickness of the fin material is reduced, the filler metal is diffused into the core material along the thickness direction during brazing. As a result, intergranular corrosion occurs in the core material along the thickness direction after brazing, whereby the strength of the heat exchanger core cannot be ensured.

In order to solve the above problem, JP-A-2004-84060 attempts to reduce intergranular corrosion of a brazing fin material for heat exchangers by providing the core material before brazing with a fibrous structure, adjusting the grain size of the structure after brazing to 50 to 250 μm, and specifying the metal elements and their content in the core material and the filler metal, for example.

However, when the thickness of the brazing fin material for heat exchangers is reduced to as small as 0.06 mm or less, the brazing fin material disclosed in JP-A-2004-84060 cannot sufficiently prevent intergranular corrosion.

In order to improve the heat transfer efficiency of the brazing fin material for heat exchangers with a cooling medium such as air, the coil of the brazing fin material is slit and corrugated using a forming die to increase the surface area or produce turbulent flows, thereby increasing heat exchange performance. However, when forming the brazing fin material for heat exchangers using a forming die, the die wears to a large extent in comparison with the case of forming a fin material on which a filler metal is not clad, whereby the life of the die is reduced.

When the thickness of the brazing fin material for heat exchangers is reduced, the amount of filler metal flowing toward the joint portion during brazing decreases, whereby the joinability of the joint portion deteriorates, or deformation (high-temperature buckling) due to high-temperature heating tends to occur. Therefore, the brazing fin material for heat exchangers is required to exhibit excellent joinability of the joint portion and excellent high-temperature buckling resistance, even if the thickness of the brazing fin material is reduced.

The brazing fin material for heat exchangers also has a problem in which intergranular corrosion of the core material cannot be sufficiently prevented when the thickness of the brazing fin material is reduced to as small as 0.06 mm or less, whereby it is difficult to ensure the strength of the heat exchanger core.

Accordingly, an object of the present invention is to provide a brazing fin material for heat exchangers of which the core material rarely undergoes intergranular corrosion even if the thickness of the brazing fin material is reduced to 0.06 mm or less, ensures excellent joinability of the joint portion, exhibits excellent high-temperature buckling resistance, and rarely causes die wear during corrugating, and a heat exchanger including a fin material in which intergranular corrosion rarely occurs.

JP-A-2003-39194 discloses a brazing sheet in which the coarse silicon particles in the filler metal have a maximum diameter of 20 μm or less. However, since JP-A-2003-39194 aims at preventing formation of holes in the brazing sheet due to melting during brazing, JP-A-2003-39194 differs in object from the present invention aiming at preventing intergranular corrosion of the brazing fin material after brazing. Since JP-A-2003-39194 relates to an invention of a brazing sheet, JP-A-2003-39194 does not take corrugating into consideration.

SUMMARY OF THE INVENTION

The inventors of the present invention have conducted extensive studies in order to solve the problems of the related art. As a result, the inventors have found that (1) a brazing fin material for heat exchangers in which intergranular corrosion rarely occurs in the core material and which causes die wear during corrugating to only a small extent can be obtained by reducing the particle diameters of silicon particles in the filler metal and adjusting the silicon content within a specific range, and (2) a heat exchanger including a fin material in which intergranular corrosion occurs to only a small extent can be obtained by brazing using the above brazing fin material for heat exchangers under specific conditions. These finding have led to the completion of the present invention.

Specifically, the present invention provides a brazing fin material for heat exchangers comprising a core material and a filler metal clad on each side of the core material, the core material being an aluminum alloy including manganese, the filler metal being an aluminum alloy including 6 to 9.5 mass % of silicon, silicon particles in the filler metal having an average circle equivalent diameter of 3 μm or less, and the brazing fin material having a thickness of 0.06 mm or less.

The present invention also provides a heat exchanger obtained by corrugating the brazing fin material for heat exchangers according to the present invention to obtain a corrugated brazing fin material, assembling the corrugated brazing fin material, a working fluid passage material, and a header, and brazing the assembled product under conditions where the heating time in a temperature region of 450° C. or more is 3 to 10 minutes.

The present invention further provides a method of manufacturing a heat exchanger comprising corrugating the brazing fin material for heat exchangers according to the present invention to obtain a corrugated brazing fin material, assembling the corrugated brazing fin material, a working fluid passage material, and a header, and brazing the assembled product under conditions where the heating time in a temperature region of 450° C. or more is 3 to 10 minutes.

According to the present invention, a brazing fin material for heat exchangers can be provided of which the core material rarely undergoes intergranular corrosion even if the thickness of the brazing fin material is reduced to 0.06 mm or less, ensures excellent joinability of the joint portion, exhibits excellent high-temperature buckling resistance, and rarely causes die wear during corrugating. According to the present invention, a heat exchanger can also be provided including a fin material in which intergranular corrosion rarely occurs.

DETAILED DESCRIPTION OF THE INVENTION AND PREFERRED EMBODIMENTS

The brazing fin material for heat exchangers according to the present invention includes a core material and a filler metal clad on each side of the core material.

The core material of the brazing fin material for heat exchangers according to the present invention is an aluminum alloy including manganese.

It is preferable that the core material be an aluminum alloy including 1.0 to 1.8 mass % of manganese, 0.3 to 1.0 mass % of silicon, 0.05 to 0.3 mass % of iron, and 1.0 to 3.0 mass % of zinc.

Since the core material includes manganese, the core material exhibits high strength. If the manganese content in the core material is too high, coarse crystallized products tend to be produced when casting a core material alloy ingot. Therefore, the manganese content in the core material is preferably 1.0 to 1.8 mass % in order to increase the strength of the core material and suppress production of coarse crystallized products during casting.

Silicon in the core material is bonded to manganese to produce Al—Mn—Si base compounds, thereby increasing the strength of the core material. If the silicon content in the core material is too high, the melting point of the core material decreases to a large extent, whereby the fin material tends to melt or buckle during brazing. Therefore, the silicon content in the core material is preferably 0.3 to 1.0 mass % in order to increase the strength of the core material and to suppress melting or buckling of the fin material during brazing.

Since the core material includes iron, the core material exhibits high strength. If the iron content in the core material is too high, aluminum grains tend to have a reduced size in the core material after brazing, whereby intergranular corrosion of the core material tends to occur. Therefore, the iron content in the core material is preferably 0.05 to 0.3 mass % in order to increase the strength of the core material and suppress intergranular corrosion.

Since the core material includes zinc, the fin material exhibits an increased sacrificial anode effect. If the zinc content in the core material is too high, self-corrosion of the fin material increases. Therefore, the zinc content in the core material is preferably 1.0 to 3.0 mass % in order to increase the sacrificial anode effect of the fin material and suppress self-corrosion.

It is particularly preferable that the core material further include one or two or more of 0.05 to 0.3 mass % of chromium, 0.05 to 0.3 mass % of titanium, and 0.05 to 0.3 mass % of zirconium. The content of two or more of chromium, titanium, and zirconium included in the core material refers to the content of each element.

When the core material includes one or two or more of chromium, titanium, and zirconium, the aluminum grains have an increased size in the core material after brazing, whereby intergranular corrosion of the core material rarely occurs. If the content of chromium, titanium, and zirconium in the core material is too high, it may become difficult to work the brazing fin material for heat exchangers. Therefore, it is particularly preferable that the core material further include one or two or more of 0.05 to 0.3 mass % of chromium, 0.05 to 0.3 mass % of titanium, and 0.05 to 0.3 mass % of zirconium in order to suppress intergranular corrosion of the core material and increase the workability of the fin material.

When the core material includes copper, intergranular corrosion of the core material tends to occur after brazing. Therefore, it is preferable that the copper content in the core material be 0.1 mass % or less.

It is preferable that the core material include 0.3 mass % or less of indium, tin, or gallium in order to suppress a decrease in thermal conductivity of the fin material and increase the sacrificial anode effect of the fin material.

The core material may include 0.01 mass % or less of vanadium, molybdenum, or nickel in order to increase the strength of the core material. The core material may include 0.1 mass % or less of boron in order to prevent oxidation. The core material may include 0.1 mass % (respective content) or less of lead, lithium, strontium, calcium, or sodium. When applying vacuum brazing, the core material may include 0.5 mass % or less of magnesium in order to increase the strength of the core material.

The filler metal of the brazing fin material for heat exchangers according to the present invention is an aluminum alloy including 6 to 9.5 mass % of silicon. Silicon in the filler metal decreases the melting point of the filler metal to increase the flowability of the molten filler metal. If the silicon content in the filler metal is less than 6 mass %, the flowability of the molten filler metal decreases, whereby the joinability of the joint portion tends to decrease. If the silicon content in the filler metal exceeds 9.5 mass %, the amount of silicon diffuised into the core material increases, whereby intergranular corrosion of the core material tends to occur.

The average circle equivalent diameter of the silicon particles in the filler metal is 3 μm or less, preferably 0.2 to 3 μm. If the average circle equivalent diameter of the silicon particles in the filler metal exceeds 3 μm, the amount of silicon diffused into the core material increases, whereby intergranular corrosion of the core material tends to occur. Moreover, die wear tends to occur when corrugating the brazing fin material for heat exchangers. In addition, the flowability of the filler metal decreases, whereby the joinability of the joint portion tends to decrease.

The average circle equivalent diameter of the silicon particles in the filler metal is adjusted to the desired value by adding strontium, sodium, or antimony to a core material alloy ingot used to clad the filler metal on the core material in a selected amount, for example.

The circle equivalent diameters of the silicon particles in the filler metal are 20 μm or less, and preferably 0.1 to 15 μm. When the average value and the standard deviation in the normal distribution of the silicon particles in the filler metal are respectively μ and σ, the value (μ+3σ) is preferably 15 μm or less, and particularly preferably 4 to 10 μm. If the grain size and the value (μ+3σ) of the silicon particles in the filler metal are within the above ranges, the effect of the present invention of suppressing intergranular corrosion of the core material is further increased. The average circle equivalent diameter, the circle equivalent diameters, and the value (μ+3σ) of the silicon particles in the filler metal are values measured by microstructure observation described later.

The filler metal is preferably an aluminum alloy including (a) 6 to 9.5 mass % of silicon and (b) one or two or more of 0.01 to 0.03 mass % of strontium, 0.001 to 0.02 mass % of sodium, and 0.05 to 0.4 mass % of antimony.

When the filler metal alloy ingot used to clad the filler metal on the core material includes strontium, sodium, or antimony, the silicon particles in the filler metal after being clad on the core material have a reduced size. If the content of strontium, sodium, or antimony in the filler metal is too high, the flowability of the filler metal tends to decrease, whereby the joinability of the joint portion tends to decrease. Therefore, it is preferable that the filler metal include one or two or more of 0.01 to 0.03 mass % of strontium, 0.001 to 0.02 mass % of sodium, and 0.05 to 0.4 mass % of antimony in order to reduce the size of the silicon particles in the filler metal and provide the filler metal with high flowability.

When the filler metal includes iron, self-corrosion of the filler metal tends to occur. Therefore, it is preferable that the iron content in the filler metal be 0.8 mass % or less. The filler metal may include 0.3 mass % or less of titanium or 0.01 mass % or less of boron in order to refine the cast structure of the filler metal alloy ingot. The filler metal may include 0.1 mass % or less of indium, tin, or gallium in order to increase the sacrificial anode effect. The filler metal may include 0.1 mass % or less of beryllium in order to suppress growth of a surface oxidized film. The filler metal may include 0.4 mass % or less of bismuth in order to improve the flowability of the filler metal. The filler metal may include 0.3 mass % (respective content) or less of chromium, copper, and manganese, and may include 0.1 mass % (respective content) or less of lead, lithium, and calcium. When applying vacuum brazing, the filler metal may include 2.0 mass % or less of magnesium. When applying brazing using a fluoride flux, the filler metal may include 0.5 mass % or less of magnesium.

In the present invention, the content of manganese, silicon, iron, zinc, chromium, titanium, zirconium, strontium, sodium, antimony, and the like in the core material or the filler metal refers to the content of the respective element.

The brazing fin material for heat exchangers according to the present invention is obtained by cladding the filler metal on each side of the core material. As the method of cladding the filler metal on the core material, a method can be given which includes casting a core material alloy ingot and a filler metal alloy ingot having the same composition as the composition of each element in the core material or the filler metal, homogenizing the core material alloy ingot according to an ordinary method and hot-rolling the filler metal alloy ingot, combining the homogenized core material alloy ingot and the hot-rolled filler metal alloy ingot and subjecting the combined alloy ingots to hot rolling, annealing, and cold rolling or hot rolling, cold rolling, and annealing in that order, and subjecting the resulting product to final cold rolling.

It is preferable that the filler metal alloy ingot include one or two or more of 0.01 to 0.03 mass % of strontium, 0.001 to 0.02 mass % of sodium, and 0.05 to 0.4 mass % of antimony since the silicon particles in the filler metal have a reduced size.

The thickness of the brazing fin material for heat exchangers according to the present invention is 0.06 mm or less, and preferably 0.04 to 0.06 mm.

The average cladding rate of one side of the brazing fin material for heat exchangers according to the present invention is preferably 5 to 20%. If the cladding rate of one side of the brazing fin material is less than 5%, the thickness of the filler metal clad on the core material is small, whereby an excellent brazed fillet may not be obtained. If the cladding rate exceeds 20%, a uniform cladding rate may not be obtained, or the core material tends to be dissolved or eroded due to an increase in the amount of molten filler metal. Moreover, since the amount of silicon diffused into the core material increases, intergranular corrosion of the core material tends to occur.

A heat exchanger according to the present invention is obtained by corrugating the brazing fin material for heat exchangers according to the present invention to obtain a corrugated brazing fin material, assembling the corrugated brazing fin material, a working fluid passage material, and a header, and brazing the assembled product.

The assembled product is brazed under conditions where the heating time in the temperature region of 450° C. or more is 3 to 10 minutes, and preferably 5 to 7 minutes. Since the product obtained by assembling the corrugated brazing fin material, the working fluid passage material, and the header is heated from a temperature lower than 450° C. to generally about 600° C. and cooled to a temperature lower than 450° C., the period of time from the time at which the heating temperature reaches 450° C. to the time at which the cooling temperature reaches 450° C. is adjusted to 3 to 10 minutes, and preferably 5 to 7 minutes. A heat exchanger in which the fin material exhibits intergranular corrosion to only a small extent is obtained by brazing the product under conditions where the heating time in the temperature region of 450° C. or more is 3 to 10 minutes, and preferably 5 to 7 minutes.

In the production of the heat exchanger according to the present invention, the brazing fin material for heat exchangers according to the present invention may be slit at a specific width before corrugating the brazing fin material.

The working fluid passage material is a tube through which a refrigerant is circulated, and is obtained by extruding a JIS A1100 alloy, a JIS A3003 alloy, or the like in the shape of a flat tube, for example. The working fluid passage material is also obtained by forming a manganese-containing aluminum alloy sheet material such as a JIS A3003 alloy into a flat tube. In order to improve perforation corrosion resistance, the surface of the working fluid passage material may be subjected to zinc spraying, a zinc-containing flux may be applied to the surface of the working fluid passage material, or a zinc-containing layer may be clad on the working fluid passage material.

The heat exchanger according to the present invention is obtained by alternately stacking the corrugated brazing fin materials and the working fluid passage materials, combining the resulting product and the header, and brazing the combined product. In this case, the brazed stacked product of the corrugated brazing fin materials and the working fluid passage materials is a heat exchanger core.

In the heat exchanger according to the present invention, it is preferable that the aluminum grain size in the core material after brazing be 100 μm or more, and preferably 100 to 3000 μm, since intergranular corrosion of the core material rarely occurs due to a decrease in the number of grain boundaries in the core material. The aluminum grain size in the core material after brazing is a value measured by microstructure observation described later.

In the heat exchanger according to the present invention, the aluminum grain size of the core material texture after brazing may be adjusted to 100 μm or more by adjusting the production conditions of the brazing fin material for heat exchangers according to the present invention, specifically, by adjusting the process annealing conditions and the final cold rolling conditions, for example.

The brazing fin material is generally brazed by heating the assembly of the brazing fin material, the working fluid passage material, the header, and the like at a specific temperature gradient in order to increase the production efficiency. Therefore, since the filler metal remains on the core material for a longer period of time as the period of time in which the filler metal is melted and flows toward the joint portion increases, the heating time must be increased, whereby the temperature of the filler metal on the core material increases. As the temperature of the filler metal on the core material increases, silicon in the filler metal is more easily diffused into the core material. As the period of time in which the filler metal is melted and flows toward the joint portion increases, the period of time in which the high-temperature filler metal contacts the core material increases. As the period of time in which the high-temperature filler metal contacts the core material increases, the amount of silicon diffused into the core material increases.

In the brazing fin material for heat exchangers according to the present invention, since the silicon particles are easily dissolved in the aluminum alloy during heating for brazing by adjusting the average circle equivalent diameter of the silicon particles in the filler metal to as small as 3 μm or less, the filler metal is melted in a short period of time and flows toward the joint portion before being heated to high temperature. Therefore, even if the silicon content in the filler metal is reduced to 6 to 9.5 mass %, the flowability of the filler metal during melting can be improved. According to the brazing fin material for heat exchangers according to the present invention, the filler metal promptly moves away from the core material before being heated to high temperature, and the amount of silicon diffused into the core material of the fin decreases due to the low silicon content in the filler metal, whereby the amount of silicon diffused to reach the center of the core material can be reduced. Therefore, intergranular corrosion of the core material occurs to only a small extent. According to the brazing fin material for heat exchangers according to the present invention, since the filler metal promptly moves away from the core material before being heated to high temperature, the amount of filler metal diffused into the core material decreases, whereby the high-temperature buckling resistance of the brazing fin material increases. According to the brazing fin material for heat exchangers according to the present invention, since the filler metal exhibits excellent flowability, the joinability of the joint portion is improved. Moreover, the brazing fin material for heat exchangers according to the present invention can reduce die wear during corrugating since the silicon particles in the filler metal have a reduced size.

Specifically, the brazing fin material for heat exchangers according to the present invention can suppress intergranular corrosion of the core material, increase high-temperature buckling resistance, improve the joinability of the joint portion, and reduce die wear during corrugating by adjusting the average circle equivalent diameter of the silicon particles in the filler metal to 3 μm and adjusting the silicon content in the filler metal to 6 to 9.5 mass %.

If the average circle equivalent diameter of the silicon particles in the filler metal exceeds 3 μm, since the silicon particles are dissolved in the aluminum alloy to only a small extent during brazing, the period of time until the filler metal is completely melted increases. As a result, the temperature of the filler metal on the core material becomes too high, and the period of time in which the high-temperature filler metal contacts the core material increases. Therefore, if the average circle equivalent diameter of the silicon particles in the filler metal exceeds 3 μm, the amount of silicon diffused into the core material increases, whereby the amount of silicon diffused to reach the center of the core material increases. Moreover, if the average circle equivalent diameter of the silicon particles in the filler metal exceeds 3 μm, since the silicon content in the filler metal must be increased in order to improve the flowability of the filler metal, the amount of silicon diffused into the core material of the fin increases, whereby the amount of silicon difflused to reach the center of the core material increases.

According to the brazing fin material for heat exchangers according to the present invention, since the filler metal exhibits high flowability during brazing, reliable brazing can be achieved even if the heating time in the temperature region of 450° C. or more is reduced to 3 to 10 minutes. Since diffusion of silicon in the filler metal into the core material can be suppressed by brazing the materials in a short period of time using the brazing fin material for heat exchangers according to the present invention, a heat exchanger can be manufactured in which intergranular corrosion of the core material occurs to only a small extent. Therefore, since a decrease in strength of the heat exchanger core due to intergranular corrosion of the fin material occurs to only a small extent, the heat exchanger according to the present invention has high reliability.

The present invention is described below by examples and comparative examples to demonstrate the effects of the present invention. It should be understood that the following examples illustrate one aspect of the present invention and should not be construed as limiting the present invention.

EXAMPLES

Example 1 and Comparative Example 1

(Production of Brazing Fin Material for Heat Exchangers)
A core material alloy ingot having the composition shown in Table 1 and a filler metal alloy ingot having the composition shown in Table 2 were cast by continuous casting. The core material alloy ingot was homogenized. The filler metal alloy ingot was hot-rolled to a specific thickness. After placing the filler metal alloy ingot on each side of the core material alloy ingot, the resulting product was hot-rolled to obtain a clad material in which the filler metal was clad on each side of the core material. The clad material was then subjected to cold rolling, process annealing, and cold rolling to obtain a brazing fin material with a thickness of 0.06 mm (Examples Nos. A to T and Comparative Examples Nos. a to p). The cladding rate was 10%. The average circle equivalent diameter, the circle equivalent diameters, and the value ($\mu+3\sigma$) of the silicon particles in the filler metal of the resulting brazing fin material were measured by microstructure observation. The die-wear properties of the resulting brazing fin material was evaluated. The results are shown in Tables 3 and 5.

<Analysis of Silicon Particles in Filler Metal>

After polishing the surface of the brazing fin material, the surface of the brazing fin material was etched using a 1% hydrofluoric acid aqueous solution. The particle size distribution of the silicon particles in the filler metal was determined by measuring the distribution of the silicon particles per 1 mm² using an image processing device (microstructure observation). The circle equivalent diameter was employed as the silicon particle diameter. The average circle equivalent diameter, the circle equivalent diameters, and the value ($\mu+3\sigma$) of the silicon particles were determined.

<Evaluation of Die-wear Properties of Brazing Fin Material>

The brazing fin material was repeatedly cut using brand-new scissors made of SUS304. After cutting the brazing fin material 400 times, the blades of the scissors were observed using a microscope. A case where the blades did not wear was evaluated as "Good", a case where the blades were worn to a small extent was evaluated as "Fair", and a case where the blades were worn to a large extent was evaluated as "Bad".

(Production of Core Sample)

The brazing fin material was corrugated and attached to a tube (working fluid passage material) formed of a pure aluminum porous flat tube (50 stages) provided with a zinc surface treatment. The resulting product was combined with a header tank and a side plate provided with engaging sections. After spraying with a fluoride flux, the product was subjected to inert atmosphere brazing at 600° C. (maximum temperature) to obtain a core sample. The product was brazed under conditions where the heating time in the temperature region of 450° C. or more was 8 minutes. The joining rate after brazing, the joint length of the joint portion, the presence or absence of melt buckling of the joint portion, intergranular corrosion resistance, and the corrosion depth of the tube were evaluated. The results are shown in Tables 4 and 6.

<Joining Rate>

A jig was pressed against the brazing fin material after brazing to cause the fin material to break, and the joint between the surface of the tube material and the fin material was observed. The number of joined fin ridges was counted to calculate the joining rate using the following expression (1).

Joining rate (%)=(number of joined fin ridges/total number of corrugates)×100     (1)

<Joint Length>

A representative area of the joint portion was collected and buried in a resin. The average value of the joint length of the joint portion was measured. A case where the average joint length was 1.0 mm or more was evaluated as "Good", and a case where the average joint length was less than 1.0 mm was evaluated as "Bad".

<Presence or Absence of Melt Buckling of Joint Portion>

A representative area of the joint portion was collected and buried in a resin. The presence or absence of melt buckling of the joint portion was observed. A case where melt buckling was not observed was evaluated as "Good", and a case where melt buckling was observed was evaluated as "Bad".

<Intergranular Corrosion Resistance>

After subjecting the core sample to a SWAAT corrosion test (ASTM G85-85) for four weeks, the cross-sectional texture of the fin material was observed to determine intergranular corrosion resistance. A case where intergranular corrosion did not reach the center of the core material was evaluated as "Good", and a case where intergranular corrosion reached the center of the core material was evaluated as "Bad". When the cross-sectional texture could not be observed due to corrosion of the entire fin, self-corrosion resistance was evaluated as "Bad".

<Corrosion Depth of Tube>

The surface of the tube subjected to the above SWAAT corrosion test was observed using a stereoscopic microscope. The corrosion depth of the corroded portion was measured using a depth of focus method.

A single sheet of the brazing fin material was heated under the above brazing conditions. The strength of the fin material and the aluminum grain size in the fin material after heating for brazing were measured. The results are shown in Tables 4 and 6.

<Strength of Fin Material After Heating for Brazing>

A JIS No. 5 specimen (JIS Z2201) was prepared from the fin material after heating for brazing and subjected to a tensile test in accordance with JIS Z2241 to measure the strength of the fin material.

<Aluminum Grain Size in Fin Material After Heating for Brazing>

The aluminum grain size in the fin material after heating for brazing was measured using a crystal structure observation method. The surface of the fin material after heating for brazing was polished to remove the filler metal layer, subjected to electrolytic etching, and observed using a polarization microscope. The grain size was measured using an ASTM card.

TABLE 1

| | | Mn | Si | Fe | Zn | Cr | Ti | Zr |
|---|---|---|---|---|---|---|---|---|
| Core material of Example | Core 1 | 1.65 | 0.82 | 0.18 | 1.5 | — | — | — |
| | Core 2 | 1.08 | 0.82 | 0.18 | 1.5 | — | — | — |
| | Core 3 | 1.76 | 0.82 | 0.18 | 1.5 | — | — | — |
| | Core 4 | 1.65 | 0.35 | 0.18 | 1.5 | — | — | — |
| | Core 5 | 1.65 | 0.95 | 0.18 | 1.5 | — | — | — |
| | Core 6 | 1.65 | 0.82 | 0.08 | 1.5 | — | — | — |
| | Core 7 | 1.65 | 0.82 | 0.25 | 1.5 | — | — | — |
| | Core 8 | 1.65 | 0.82 | 0.18 | 1.1 | — | — | — |
| | Core 9 | 1.65 | 0.82 | 0.18 | 2.8 | — | — | — |
| | Core 10 | 1.65 | 0.82 | 0.18 | 1.5 | 0.14 | — | — |
| | Core 11 | 1.65 | 0.82 | 0.18 | 1.5 | — | 0.13 | — |
| | Core 12 | 1.65 | 0.82 | 0.18 | 1.5 | — | — | 0.16 |
| Core material of Comparative Example | Core 13 | 0.95 | 0.82 | 0.18 | 1.5 | — | — | — |
| | Core 14 | 2.3 | 0.88 | 0.18 | 1.5 | — | — | — |
| | Core 15 | 1.65 | 0.26 | 0.18 | 1.5 | — | — | — |
| | Core 16 | 1.65 | 1.22 | 0.18 | 1.5 | — | — | — |
| | Core 17 | 1.65 | 0.80 | 0.60 | 1.5 | — | — | — |
| | Core 18 | 1.65 | 0.81 | 0.18 | 0.4 | — | — | — |
| | Core 19 | 1.65 | 0.85 | 0.18 | 3.8 | — | — | — |
| | Core 20 | 1.65 | 0.85 | 0.18 | 1.5 | 0.4 | — | — |
| | Core 21 | 1.65 | 0.85 | 0.18 | 1.5 | — | 0.4 | — |
| | Core 22 | 1.65 | 0.85 | 0.18 | 1.5 | — | — | 0.4 |

TABLE 2

|  |  | Si | Sr | Na | Sb |
|---|---|---|---|---|---|
| Filler metal of Example | Filler metal 1 | 8.9 | 0.021 | — | — |
|  | Filler metal 2 | 7.5 | 0.021 | — | — |
|  | Filler metal 3 | 9.4 | 0.021 | — | — |
|  | Filler metal 4 | 8.9 | 0.013 | — | — |
|  | Filler metal 5 | 8.9 | 0.030 | — | — |
|  | Filler metal 6 | 8.9 | — | 0.003 | — |
|  | Filler metal 7 | 8.9 | — | 0.015 | — |
|  | Filler metal 8 | 8.9 | — | — | 0.003 |
|  | Filler metal 9 | 8.9 | — | — | 0.34 |
| Filler metal of Comparative Example | Filler metal 10 | 5.3 | 0.021 | — | — |
|  | Filler metal 11 | 10.1 | 0.021 | — | — |
|  | Filler metal 12 | 8.9 | — | — | — |
|  | Filler metal 13 | 8.9 | 0.05 | — | — |
|  | Filler metal 14 | 8.9 | — | 0.03 | — |
|  | Filler metal 15 | 8.9 | — | — | 0.6 |

TABLE 3

| Example No. | Core material | Filler metal | Average diameter of silicon particles in filler metal (μm)[1] | Diameters of silicon particles in filler metal (μm)[2] | $(\mu + 3\sigma)$ value (μm) | Die-wear properties |
|---|---|---|---|---|---|---|
| A | 1 | 1 | 1.8 | 0.3 to 8.5 | 5.2 | Good |
| B | 2 | 1 | 1.8 | 0.3 to 8.5 | 5.2 | Good |
| C | 3 | 1 | 1.8 | 0.3 to 8.5 | 5.2 | Good |
| D | 4 | 1 | 1.8 | 0.3 to 8.5 | 5.2 | Good |
| E | 5 | 1 | 1.8 | 0.3 to 8.5 | 5.2 | Good |
| F | 6 | 1 | 1.8 | 0.3 to 8.5 | 5.2 | Good |
| G | 7 | 1 | 1.8 | 0.3 to 8.5 | 5.2 | Good |
| H | 8 | 1 | 1.8 | 0.3 to 8.5 | 5.2 | Good |
| I | 9 | 1 | 1.8 | 0.3 to 8.5 | 5.2 | Good |
| J | 10 | 1 | 1.8 | 0.3 to 8.5 | 5.2 | Good |
| K | 11 | 1 | 1.8 | 0.3 to 8.5 | 5.2 | Good |
| L | 12 | 1 | 1.8 | 0.3 to 8.5 | 5.2 | Good |
| M | 1 | 2 | 1.8 | 0.3 to 8.3 | 5.0 | Good |
| N | 1 | 3 | 1.8 | 0.3 to 8.8 | 6.3 | Good |
| O | 1 | 4 | 2.3 | 0.3 to 9.4 | 8.5 | Good |
| P | 1 | 5 | 1.7 | 0.3 to 8.0 | 4.8 | Good |
| Q | 1 | 6 | 2.1 | 0.3 to 10.2 | 9.5 | Good |
| R | 1 | 7 | 1.9 | 0.3 to 8.5 | 7.4 | Good |
| S | 1 | 8 | 2.3 | 0.3 to 10.8 | 10.2 | Good |
| T | 1 | 9 | 1.8 | 0.3 to 8.0 | 7.2 | Good |

[1] Average circle equivalent diameter of silicon particles in filler metal
[2] Circle equivalent diameters of silicon particles in filler metal

TABLE 4

| Example No. | Core material | Filler metal | Strength of fin material after brazing (MPa) | Aluminum grain size after brazing[1] (μm) | Joining rate (%) | Joint length | Melt buckling | Intergranular corrosion resistance | Corrosion depth of tube (mm) |
|---|---|---|---|---|---|---|---|---|---|
| A | 1 | 1 | 165 | 250 | 100 | Good | Good | Good | 0.03 |
| B | 2 | 1 | 150 | 270 | 100 | Good | Good | Good | 0.02 |
| C | 3 | 1 | 170 | 250 | 100 | Good | Good | Good | 0.03 |
| D | 4 | 1 | 158 | 350 | 100 | Good | Good | Good | 0.03 |
| E | 5 | 1 | 172 | 240 | 100 | Good | Good | Good | 0.03 |
| F | 6 | 1 | 165 | 350 | 100 | Good | Good | Good | 0.01 |
| G | 7 | 1 | 168 | 120 | 100 | Good | Good | Good | 0.03 |
| H | 8 | 1 | 163 | 240 | 100 | Good | Good | Good | 0.04 |
| I | 9 | 1 | 166 | 230 | 100 | Good | Good | Good | 0.03 |
| J | 10 | 1 | 165 | 320 | 100 | Good | Good | Good | 0.03 |
| K | 11 | 1 | 164 | 320 | 100 | Good | Good | Good | 0.03 |
| L | 12 | 1 | 163 | 350 | 100 | Good | Good | Good | 0.03 |
| M | 1 | 2 | 163 | 250 | 95 | Good | Good | Good | 0.03 |
| N | 1 | 3 | 169 | 260 | 100 | Good | Good | Good | 0.02 |
| O | 1 | 4 | 164 | 250 | 100 | Good | Good | Good | 0.03 |

TABLE 4-continued

| Example No. | Core material | Filler metal | Strength of fin material after brazing (MPa) | Aluminum grain size after brazing[1] (μm) | Joining rate (%) | Joint length | Melt buckling | Intergranular corrosion resistance | Corrosion depth of tube (mm) |
|---|---|---|---|---|---|---|---|---|---|
| P | 1 | 5 | 165 | 240 | 100 | Good | Good | Good | 0.03 |
| Q | 1 | 6 | 165 | 240 | 100 | Good | Good | Good | 0.04 |
| R | 1 | 7 | 166 | 250 | 100 | Good | Good | Good | 0.03 |
| S | 1 | 8 | 164 | 260 | 100 | Good | Good | Good | 0.03 |
| T | 1 | 9 | 164 | 260 | 100 | Good | Good | Good | 0.02 |

[1] Aluminum grain size in fin material after heating for brazing

TABLE 5

| Comparative Example No. | Core material | Filler metal | Average diameter of silicon particles in filler metal (μm)[1] | Diameters of silicon particles in filler metal (μm)[2] | ($\mu + 3\sigma$) value (μm) | Die-wear properties |
|---|---|---|---|---|---|---|
| a | 13 | 1 | 1.8 | 0.3-8.5 | 5.2 | Good |
| b | 14 | 1 | 1.8 | Could not be evaluated due to insufficient rolling | | |
| c | 15 | 1 | 1.8 | 0.3-8.5 | 5.2 | Good |
| d | 16 | 1 | 1.8 | 0.3-8.5 | 5.2 | Good |
| e | 17 | 1 | 1.8 | 0.3-8.5 | 5.2 | Good |
| f | 18 | 1 | 1.8 | 0.3-8.5 | 5.2 | Good |
| g | 19 | 1 | 1.8 | 0.3-8.5 | 5.2 | Good |
| h | 20 | 1 | 1.8 | Could not be evaluated due to insufficient rolling | | |
| i | 21 | 1 | 1.8 | Could not be evaluated due to insufficient rolling | | |
| j | 22 | 1 | 1.8 | Could not be evaluated due to insufficient rolling | | |
| k | 1 | 10 | 1.8 | 0.3-7.8 | 4.6 | Good |
| l | 1 | 11 | 1.8 | 0.3-10.5 | 8.2 | Good |
| m | 1 | 12 | 4.8 | 0.3-20 | 14.8 | Bad |
| n | 1 | 13 | 1.5 | 0.3-8.0 | 4.8 | Good |
| o | 1 | 14 | 1.4 | 0.3-8.0 | 4.9 | Good |
| p | 1 | 15 | 1.6 | 0.3-8.0 | 5.2 | Good |

[1] Average circle equivalent diameter of silicon particles in filler metal
[2] Circle equivalent diameters of silicon particles in filler metal

TABLE 6

| Comparative example No. | Core material | Filler metal | Strength of fin material after brazing (MPa) | Aluminum grain size after brazing (μm) | Joining rate (%) | Joint length | Melt buckling | Intergranular corrosion resistance | Corrosion depth of tube (mm) |
|---|---|---|---|---|---|---|---|---|---|
| a | 13 | 1 | 145 | 280 | 100 | Good | Good | Good | 0.03 |
| b | 14 | 1 | Could not be evaluated due to insufficient rolling | | | | | | |
| c | 15 | 1 | 138 | 400 | 100 | Good | Good | Good | 0.03 |
| d | 16 | 1 | 130 | 120 | 100 | Good | Bad | Bad | 0.03 |
| e | 17 | 1 | 166 | 70 | 100 | Good | Bad | Bad | 0.03 |
| f | 18 | 1 | 167 | 240 | 100 | Good | Good | Good | 0.07 |
| g | 19 | 1 | 165 | 230 | 100 | Good | Good | Self-corrosion resistance was bad[2] | 0.01 |
| h | 20 | 1 | Could not be evaluated due to insufficient rolling | | | | | | |
| i | 21 | 1 | Could not be evaluated due to insufficient rolling | | | | | | |
| j | 22 | 1 | Could not be evaluated due to insufficient rolling | | | | | | |
| k | 1 | 10 | 160 | 220 | 70 | Bad | Good | Good | 0.03 |
| l | 1 | 11 | 164 | 260 | 100 | Good | Bad | Bad | 0.03 |
| m | 1 | 12 | 167 | 240 | 100 | Good | Good | Bad | 0.03 |
| n | 1 | 13 | 166 | 250 | 85 | Bad | Good | Good | 0.03 |
| o | 1 | 14 | 166 | 250 | 80 | Bad | Good | Good | 0.03 |
| p | 1 | 15 | 168 | 250 | 85 | Bad | Good | Good | 0.03 |

[1] Aluminum grain size in fin material after heating for brazing
[2] The intergranular corrosion resistance could not be evaluated due to significant self-corrosion.

Examples Nos. A to T

Although the brazing fin material had a small thickness of 0.06 mm, the brazing fin material exhibited high strength after brazing, excellent brazeability, and excellent intergranular corrosion resistance.

Comparative Examples Nos. a to p a: The brazing fin material exhibited low strength after brazing due to low manganese content in the core material.
b: A brazing sheet could not be obtained due to high manganese content in the core material.
c: The brazing fin material exhibited low strength after brazing due to low silicon content in the core material.
d: The brazing fin material underwent melt buckling during brazing due to high silicon content in the core material. The core material exhibited low strength after brazing, and intergranular corrosion reached the center of the core material.
e: The grains after brazing were small and the brazing fin material underwent melt buckling during brazing due to high iron content in the core material. Intergranular corrosion reached the center of the core material.
f: The corrosion depth of the tube was increased due to low zinc content in the core material.
g: The fin underwent self-corrosion to a large extent due to high zinc content in the core material.
h: A brazing sheet could not be obtained due to high chromium content in the core material.
i: A brazing sheet could not be obtained due to high titanium content in the core material.
j: A brazing sheet could not be obtained due to high zirconium content in the core material.
k: The joining rate was low and the joint length was inferior due to low silicon content in the filler metal.
l: Intergranular corrosion reached the center of the core material due to high silicon content in the filler metal.
m: Wear was observed due to the large silicon particle diameter in the filler metal. Intergranular corrosion reached the center of the core material.
n: The joining rate was low and the joint length was inferior due to high strontium content in the filler metal.
o: The joining rate was low and the joint length was inferior due to high sodium content in the filler metal.
p: The joining rate was low and the joint length was inferior due to high antimony content in the filler metal.

Comparative Example 2

(Production of Brazing Fin Material for Heat Exchangers)

A core material alloy ingot having the composition shown in Table 1 and a filler metal alloy ingot having the composition shown in Table 2 were cast by continuous casting. The core material alloy ingot was then homogenized. The filler metal alloy ingot was hot-rolled to a specific thickness. After placing the filler metal alloy ingot on each side of the core material alloy ingot, the resulting product was hot-rolled to obtain a clad material in which the filler metal was clad on each side of the core material. The clad material was then subjected to cold rolling, process annealing, and cold rolling to obtain a brazing fin material with a thickness of 0.06 mm (Comparative Examples Nos. q to s). The cladding rate was 10%.

(Production of Sample Core)

The brazing fin material was corrugated and attached to a tube (working fluid passage material) formed of a pure aluminum porous flat tube (50 stages) provided with a zinc surface treatment. The resulting product was combined with a header tank and a side plate provided with engaging sections. After spraying with a fluoride flux, the product was subjected to inert atmosphere brazing at 600° C. (maximum temperature) to obtain a core sample. The product was brazed under conditions where the heating time in the temperature region of 450° C. or more was 20 minutes. The joining rate after brazing, the joint length of the joint portion, the presence or absence of melt buckling of the joint portion, intergranular corrosion resistance, and the corrosion depth of the tube were evaluated. The results are shown in Table 7.

TABLE 7

| Comparative Example No. | Core material | Filler metal | Strength of fin material after brazing (Mpa) | Aluminum grain size after brazing (μm) | Joining rate (%) | Joint length | Melt buckling | Intergranular corrosion resistance | Corrosion depth of tube (mm) |
|---|---|---|---|---|---|---|---|---|---|
| q | 1 | 1 | 170 | 250 | 100 | Good | Good | Bad | 0.03 |
| r | 1 | 7 | 172 | 250 | 100 | Good | Good | Bad | 0.03 |
| s | 1 | 9 | 169 | 260 | 100 | Good | Good | Bad | 0.02 |

Comparative Examples Nos. q to s

In Comparative Examples Nos. q to s, intergranular corrosion reached the center of the core material since the heating time in the temperature region of 450° C. or more was long.

Obviously, numerous modifications and variations of the present invention are possible in light of the above teachings. It is therefore to be understood that, within the scope of the appended claims, the invention may be practiced otherwise than as specifically described herein.

What is claimed is:

1. A brazing fin material for heat exchangers comprising:
   a core material: and
   a filler metal clad on each side of the core material, wherein the core material being an aluminum alloy including manganese, the filler metal being an aluminum alloy including 6 to 9.5 mass % of silicon, silicon particles in the filler metal having an average circle equivalent diameter of 3 μm or less, and the brazing fin material having a thickness of 0.06 mm or less.

2. The brazing fin material for heat exchangers according to claim 1, wherein:
   the core material is an aluminum alloy including 1.0 to 1.8 mass % of manganese, 0.3 to 1.0 mass % of silicon, 0.05 to 0.3 mass % of iron, and 1.0 to 3.0 mass % of zinc, and the filler metal is an aluminum alloy including (a) 6 to 9.5 mass % of silicon and (b) one or two or more of 0.01 to 0.03 mass % of strontium, 0.001 to 0.02 mass % of sodium, and 0.05 to 0.4 mass % of antimony.

3. The brazing fin material for heat exchangers according to claim 2, wherein the core material further includes one or two or more of 0.05 to 0.3 mass % of chromium, 0.05 to 0.3 mass % of titanium, and 0.05 to 0.3 mass % of zirconium.

4. The brazing fin material for heat exchangers according to claim 3, wherein the silicon particles in the filler metal have a circle equivalent diameter of 20 μm or less and a value (μ+3σ) of 15 μm or less.

5. A heat exchanger obtained by corrugating the brazing fin material for heat exchangers according to claim 4 to obtain a corrugated brazing fin material, assembling the corrugated brazing fin material, a working fluid passage material, and a header, and brazing the assembled product under conditions where the heating time in a temperature region of 450° C. or more is 3 to 10 minutes.

6. A heat exchanger obtained by corrugating the brazing fin material for heat exchangers according to claim 3 to obtain a corrugated brazing fin material, assembling the corrugated brazing fin material, a working fluid passage material, and a header, and brazing the assembled product under conditions where the heating time in a temperature region of 450° C. or more is 3 to 10 minutes.

7. A method of manufacturing a heat exchanger comprising corrugating the brazing fin material for heat exchangers according to claim 3 to obtain a corrugated brazing fin material, assembling the corrugated brazing fin material, a working fluid passage material, and a header, and brazing the assembled product under conditions where the heating time in a temperature region of 450° C. or more is 3 to 10 minutes to obtain a heat exchanger.

8. A method of manufacturing a heat exchanger comprising corrugating the brazing fin material for heat exchangers according to claim 4 to obtain a corrugated brazing fin material, assembling the corrugated brazing fin material, a working fluid passage material, and a header, and brazing the assembled product under conditions where a heating time in a temperature region of 450° C. or more is 3 to 10 minutes to obtain a heat exchanger.

9. The brazing fin material for heat exchangers according to claim 2, wherein the silicon particles in the filler metal have a circle equivalent diameter of 20 μm or less and a value (μ+3σ) of 15 μm or less.

10. A heat exchanger obtained by corrugating the brazing fin material for heat exchangers according to claim 9 to obtain a corrugated brazing fin material, assembling the corrugated brazing fin material, a working fluid passage material, and a header, and brazing the assembled product under conditions where the heating time in a temperature region of 450° C. or more is 3 to 10 minutes.

11. A method of manufacturing a heat exchanger comprising corrugating the brazing fin material for heat exchangers according to claim 9 to obtain a corrugated brazing fin material, assembling the corrugated brazing fin material, a working fluid passage material, and a header, and brazing the assembled product under conditions where the heating time in a temperature region of 450° C. or more is 3 to 10 minutes to obtain a heat exchanger.

12. A heat exchanger obtained by corrugating the brazing fin material for heat exchangers according to claim 2 to obtain a corrugated brazing fin material, assembling the corrugated brazing fin material, a working fluid passage material, and a header, and brazing the assembled product under conditions where the heating time in a temperature region of 450° C. or more is 3 to 10 minutes.

13. A method of manufacturing a heat exchanger comprising corrugating the brazing fin material for heat exchangers according to claim 2 to obtain a corrugated brazing fin material, assembling the corrugated brazing fin material, a working fluid passage material, and a header, and brazing the assembled product under conditions where the heating time in a temperature region of 450° C. or more is 3 to 10 minutes to obtain a heat exchanger.

14. The brazing fin material for heat exchangers according to claim 1, wherein the silicon particles in the filler metal have a circle equivalent diameter of 20 μm or less and a value (μ+3σ) of 15 μm or less.

15. A heat exchanger obtained by corrugating the brazing fin material for heat exchangers according to claim 14 to obtain a corrugated brazing fin material, assembling the corrugated brazing fin material, a working fluid passage material, and a header, and brazing the assembled product under conditions where the heating time in a temperature region of 450° C. or more is 3 to 10 minutes.

16. A method of manufacturing a heat exchanger comprising corrugating the brazing fin material for heat exchangers according to claim 14 to obtain a corrugated brazing fin material, assembling the corrugated brazing fin material, a working fluid passage material, and a header, and brazing the assembled product under conditions where the heating time in a temperature region of 450° C. or more is 3 to 10 minutes to obtain a heat exchanger.

17. A heat exchanger obtained by corrugating the brazing fin material for heat exchangers according to claim 1 to obtain a corrugated brazing fin material, assembling the corrugated brazing fin material, a working fluid passage material, and a header, and brazing the assembled product under conditions where the heating time in a temperature region of 450° C. or more is 3 to 10 minutes.

18. The heat exchanger according to any one of claims 17 to 5, wherein the aluminum grain size in the core material after brazing is 100 μm or more.

19. A method of manufacturing a heat exchanger comprising corrugating the brazing fin material for heat exchangers according to claim 1 to obtain a corrugated brazing fin material, assembling the corrugated brazing fin material, a working fluid passage material, and a header, and brazing the assembled product under conditions where the heating time in a temperature region of 450° C. or more is 3 to 10 minutes to obtain a heat exchanger.

\* \* \* \* \*